US009552724B2

(12) United States Patent
Rothschild

(10) Patent No.: US 9,552,724 B2
(45) Date of Patent: *Jan. 24, 2017

(54) TRAFFIC CITATION DELIVERY BASED ON TYPE OF TRAFFIC INFRACTION

(71) Applicant: Leigh M. Rothschild, Sunny Isles Beach, FL (US)

(72) Inventor: Leigh M. Rothschild, Sunny Isles Beach, FL (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/683,264

(22) Filed: Nov. 21, 2012

(65) Prior Publication Data

US 2013/0076906 A1 Mar. 28, 2013

Related U.S. Application Data

(63) Continuation-in-part of application No. 13/223,978, filed on Sep. 1, 2011, now abandoned, which is a continuation of application No. 12/907,702, filed on Oct. 19, 2010, now Pat. No. 8,031,084, which is a continuation-in-part of application No. 12/234,825, filed on Sep. 22, 2008, now Pat. No. 8,009,062.

(51) Int. Cl.
| | |
|---|---|
| *G08G 1/09* | (2006.01) |
| *G08G 1/00* | (2006.01) |
| *H04N 7/18* | (2006.01) |
| *G08G 1/017* | (2006.01) |
| *G08G 1/04* | (2006.01) |

(52) U.S. Cl.
CPC ............... *G08G 1/00* (2013.01); *G08G 1/017* (2013.01); *G08G 1/04* (2013.01); *G08G 1/091* (2013.01); *H04N 7/18* (2013.01)

(58) Field of Classification Search
CPC .......... G08G 1/10; G08G 1/091; G08G 1/017; G08G 1/04; H04N 7/18; G08B 1/00
USPC ..... 340/933, 995.1, 905, 936, 937; 701/301, 701/1, 23, 20; 348/148
See application file for complete search history.

(56) References Cited

U.S. PATENT DOCUMENTS

| | | | | |
|---|---|---|---|---|
| 5,948,038 | A * | 9/1999 | Daly et al. .................... | 701/117 |
| 6,442,474 | B1 * | 8/2002 | Trajkovic et al. ............ | 701/117 |
| 6,894,717 | B2 * | 5/2005 | Bakewell ...................... | 348/149 |
| 7,657,367 | B1 * | 2/2010 | Phuyal ................. | G08G 1/0104 |
| | | | | 701/117 |
| 8,009,062 | B2 * | 8/2011 | Rothschild ............ | G08G 1/017 |
| | | | | 340/905 |
| 8,031,084 | B2 * | 10/2011 | Rothschild .................... | 340/936 |
| 2005/0088320 | A1 * | 4/2005 | Kovach ........................ | 340/933 |

(Continued)

*Primary Examiner* — Anh V La
(74) *Attorney, Agent, or Firm* — Eugenio J. Torres-Oyola; Victor Rodriguez-Reyes; Ferraiuoli LLC

(57) ABSTRACT

Embodiments of the present invention provide a method, system and computer program product for vehicle speed acquisition and citation. In accordance with an embodiment of the present invention, multiple different imaging systems can be placed individually at different locations along a route of travel, such as a highway, byway or waterway. Images of different vehicles can be captured at each of the locations and different ones of the different vehicles can be image-recognized. A time of travel between pairs of the locations can be determined for selected ones of the different vehicles in order to compute a rate of travel for the selected ones of the different vehicles. A citation signal is generated when a speed of a vehicle exceeds a predetermined speed limit such that the vehicle owner may be automatically cited for speeding.

7 Claims, 6 Drawing Sheets

(56) References Cited

U.S. PATENT DOCUMENTS

| | | | |
|---|---|---|---|
| 2005/0093720 A1* | 5/2005 | Yamane | G01C 21/3492 340/995.13 |
| 2005/0248469 A1* | 11/2005 | DeKock | G08G 1/0104 340/905 |
| 2006/0103568 A1* | 5/2006 | Powell et al. | 342/42 |
| 2006/0293046 A1* | 12/2006 | Smith | G06Q 10/06 455/423 |
| 2009/0018902 A1* | 1/2009 | Miller et al. | 705/13 |

* cited by examiner

TRAFFIC CITATION DELIVERY BASED ON TYPE OF TRAFFIC INFRACTION

CROSS-REFERENCE TO RELATED APPLICATION

This application is a continuation-in-part of patent application Ser. No. 13/223,978, filed Sep. 1, 2011, Entitled METHOD AND SYSTEM FOR TRAFFIC CONDITION DETECTION, which is a continuation of patent application Ser. No. 12/907,702, now U.S. Pat. No. 8,031,084, filed Oct. 19, 2010, entitled METHOD AND SYSTEM FOR INFRACTION DETECTION BASED ON VEHICLE TRAFFIC FLOW DATA, which is a continuation-in-part-of U.S. patent application Ser. No. 12/234,825, filed Sep. 22, 2008, now U.S. Pat. No. 8,009,062, entitled VEHICLE TRAFFIC FLOW DATA ACQUISITION AND DISTRIBUTION, the entirety of each of which are incorporated herein by reference.

STATEMENT REGARDING FEDERALLY SPONSORED RESEARCH OR DEVELOPMENT n/a

FIELD OF THE INVENTION

The present invention relates to a method and system for traffic management, and in particular to a method and system for detecting and citing vehicle traffic violations.

BACKGROUND OF THE INVENTION

The explosion of vehicle usage in the United States more than a half-century ago has brought tremendous benefit to the ordinary citizen. The advent of the interstate highway system now enables individuals to travel great distances at high speeds in short periods of time. The ease of travel afforded by the automobile and interstate highway system, however, is not without consequence. For most Americans, traffic has become a part of life and a daily annoyance. Indeed, the presence and anticipation of traffic affects ordinary citizens every day in planning travel and the timing of meetings with others.

For several decades, broadcast media adopted the responsibility of reporting traffic conditions over the airwaves such that listeners and viewers could more easily plan travel routing. Though traffic reports historically have been provided only at periodic intervals, given enough advance warning, savvy travelers could plan alternate routing responsive to the reporting of a traffic condition present at a portion of a planned route. Notwithstanding, planning an alternate route remained highly dependent on both the timing of the receipt of a traffic condition report and the knowledge of the traveler of an alternative route.

Global positioning system (GPS) technologies afford a tremendous leap forward in respect to onboard vehicle navigation and traffic condition avoidance. GPS technologies now can be found as standard equipment in many vehicles and provide the previously absent guarantee of alternate routing knowledge for drivers. Current GPS technologies further integrate with over the-air broadcasting of real-time traffic conditions utilizing Internet connectivity so that drivers can correlate traffic conditions in real-time along a proposed route of travel.

Not all traffic conditions reported through broadcast traffic reports reflect a complete standstill of traffic. Rather, in most circumstances, traffic flows in an area of congestion—just not at a high rate of speed. Travelers with advance knowledge of congestion along a planned route make alternate routing decisions based upon the nature of traffic flow. So long as traffic flows at an acceptable speed, albeit not an optimal speed, travelers are less likely to prefer an alternate route. Knowing the rate of speed of traffic in a congested area, however, requires the traveler to rely upon the estimates of real-time broadcast reports over the radio over television resulting from personally observed traffic speeds (typically by helicopter or live camera feed).

In addition to providing accurate information concerning congestion, there is a need to determine when a vehicle is engaged in a traffic violation, thereby endangering others. Conventionally, a police officer detecting a motorist engaged in speeding, reckless driving, or other traffic infraction must pull the violator over to a side of the road to issue a ticket. This endangers the police officer and endangers other motorists. Further, a police department may have an insufficient number of officers to patrol every highway and road to detect traffic law violators.

SUMMARY OF THE INVENTION

The present invention advantageously provides a method and system for processing traffic information. According to one aspect, a method includes receiving, at a computing device, data indicating a traffic violation from a vehicle data acquisition device, and sending, from the computing device, citation information concerning the violation to a selected destination. The selected destination depends upon the type of the traffic violation.

According to another aspect, the invention provides an apparatus for processing traffic violations. The apparatus includes a memory and a processor. The memory stores information concerning the traffic violation. The processor determines a type of traffic violation based on the stored information. The processor further selects a manner of delivery and a destination to send citation information concerning the traffic violation based on the type of traffic violation.

According to yet another aspect, the invention provides a method of processing traffic violation information that includes assessing fault of a vehicle. The method includes detecting a traffic violation, the detecting including evaluating information of the traffic violation obtained at a scene of the violation. The evaluation being via an image analysis algorithm. Fault is assessed base on the evaluation. Citation information is sent to a selected destination associated with an owner of a vehicle determined to be at fault.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
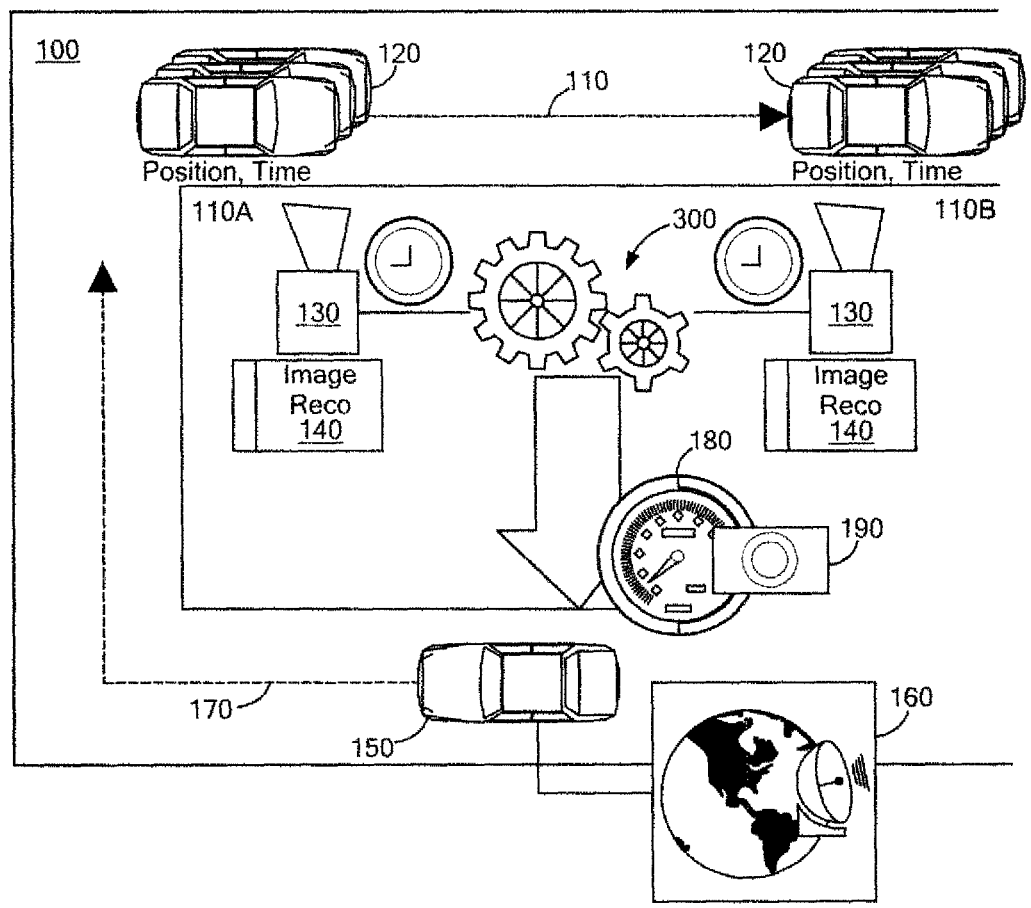
FIG. 1 is a schematic illustration of a process for vehicle traffic flow data acquisition and reporting for onboard vehicle navigation.

Embodiments of the present invention provide a method, system and computer program product for vehicle traffic violation detection and citation. In accordance with an embodiment of the present invention, multiple different imaging systems can be placed individually at different locations along a route of travel, such as a highway, byway or waterway. Images of different vehicles can be captured at each of the locations and different ones of the different vehicles can be image-recognized. A time of travel between pairs of the locations can be determined for selected ones of the different vehicles in order to compute a rate of travel for the selected ones of the different vehicles. When a speed of a vehicle exceeds a speed limit, a citation signal is generated, and the vehicle owner may be automatically cited for speeding. Further, images may be processed by an image analysis algorithm to determine other traffic violations such as weaving between lanes, running a stop sign, collisions and leaving a scene of an accident. A citation may be determined based on the processing. Citation information may be sent to a particular destination, and in a manner, that depends on the type of traffic violation detected.

Before describing in detail exemplary embodiments that are in accordance with the present invention, it is noted that the embodiments reside primarily in combinations of apparatus components and processing steps related to implementing a system and method for managing digital images. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In U.S. patent application Ser. No. 12/234,825, filed Sep. 22, 2008, entitled "Vehicle Traffic Flow Data Acquisition and Distribution," a system and method for identifying traffic congestion are disclosed. The system and method includes capturing a first image of a vehicle at a first location at a first time, capturing a second image of the vehicle at a second location at a second time, and computing a speed of the vehicle between the two locations to determine an amount of congestion. The speed of many vehicles along the route can be determined and averaged to provide an average speed of traffic along the route. The average speed and a captured image can be communicated to an on-board navigation system of a vehicle to notify its driver of the average speed and congestion along a route. As is described herein, this ability to identify a vehicle and determine its speed can be used by law enforcement to detect and cite a speeding violation by the vehicle. Alternatively, speed can be determined by a radar gun operating in conjunction with a camera, which recognizes the vehicle by processing an image of its license tag, for example.

In addition to speeding, other traffic violations can be detected by processing images of traffic captured by a camera directed to a segment of roadway. For example, images may be processed by an image analysis algorithm to detect unlawful lane changes, failure to use a turn signal, running a red light, collisions, and leaving a scene of an accident. Once such a violation is detected, a citation may be issued. The citation information may be sent to a destination that depends upon a type or seriousness of the offense. For example, the destination of the citation may be selected to be a mobile device of an owner of a vehicle involved in the traffic violation or an onboard navigation system of the vehicle, when the traffic violation is one of a speeding violation or failure to stop at a stop signal. The destination of the citation may be selected to be business address or residence address when the type of infraction involves a collision or human injury.

Referring now to the drawing figures in which like reference designators refer to like elements, there is shown in FIG. 1 a block diagram of an exemplary system constructed in accordance with the principles of the present invention. As shown in FIG. 1, imaging systems 130 can be placed at different locations 110A, 110B of a road 100. Imaging systems 130 can acquire imagery of vehicles 120 passing through the location 110A, 110B. The imagery can include individual images, or a collection of images in video imagery. An image recognizer 140 can identify individual ones of the vehicles 120 such that an elapsed time between the identified individual ones of the vehicles 120 in the captured imagery at the different locations 110 can be used to determine a rate of travel (speed) by a processor 300 for each of the identified individual ones of the vehicles 120. Alternatively, speed may be detected by a radar gun operating in conjunction with a camera and image processing that detects an identity of a speeding vehicle.

Thereafter, a vehicle 150 projected to travel along a route 170 passing through the locations 110A, 110B can retrieve the rate of travel 180 for multiple different ones of the vehicles 120 in order to identify a degree of congestion between the locations 110A, 110B. Further, imagery 190 of one or more of the locations 110A, 110B can be provided to the vehicle 150. Vehicle 150 could be a police vehicle that receives the identity, location, and speed of a speeding vehicle. Both the rate of travel 180 and the imagery 190 can be provided to the vehicle 150 through an Internet connected onboard navigation system 160. Alternatively, the rate of travel 180 can be provided to a subscriber in the vehicle 150 through text messaging, Web page, or by way of e-mail, or a computer program utilized by the subscriber to display speeding and other violations. This allows the police office to be safely positioned outside of the traffic area and then allows the police officer in vehicle 150 to find and stop the violator. Alternatively, an image processing system may identify a vehicle and direct a processor to issue a citation and to send the citation information to a destination selected based on a type of the detected offense.

The process described in connection with FIG. 1 can be employed in an onboard vehicle navigation data distribution data processing system. For example, the rate of travel 180 can be provided to the subscriber in the vehicle 150 only when the rate of travel 150 falls above or below a threshold value (essentially an alert to speeding or unacceptable traffic congestion). In the case where the vehicle 150 is the speeder, the speeder can be alerted of the same and that a citation is going to be issued or that a police officer is en route to issue the citation. Finally, as even yet another alternative, a precise location of the location 110B can be provided to the subscriber in the vehicle 150, for example in terms of latitude and longitude values.

The speed and imagery of a vehicle can also be transmitted to a central monitoring station. Imagery of the vehicle tag number may be used to identify the vehicle. For example, once the vehicle is identified as a speeding vehicle, the tag number, a Vehicle Identification Number (VIN), and the make and model of the vehicle may then be identified. A database may then be employed to determine the vehicle's owner. A citation may then be issued to the owner if it is determined that the vehicle is speeding or is detected committing other traffic violations, such as weaving in and out of lanes recklessly. The citation may be issued to the owner via at least one of email, U.S. mail, wirelessly to an electronic receiver on board the vehicle, and wirelessly to a mobile phone of the owner. The citation may be sent, for example, via text messaging to the owner's mobile phone. The destination and the manner of delivery of the citation may be selected based on a type or seriousness of the offense. For example, for offenses involving collisions or human injury, the citation may be mailed to a residence or business address of the offender by registered mail, certified mail or regular mail. Also, the citation may be mailed, emailed or faxed to an insurer of a vehicle involved in the collision.

Figure 2:
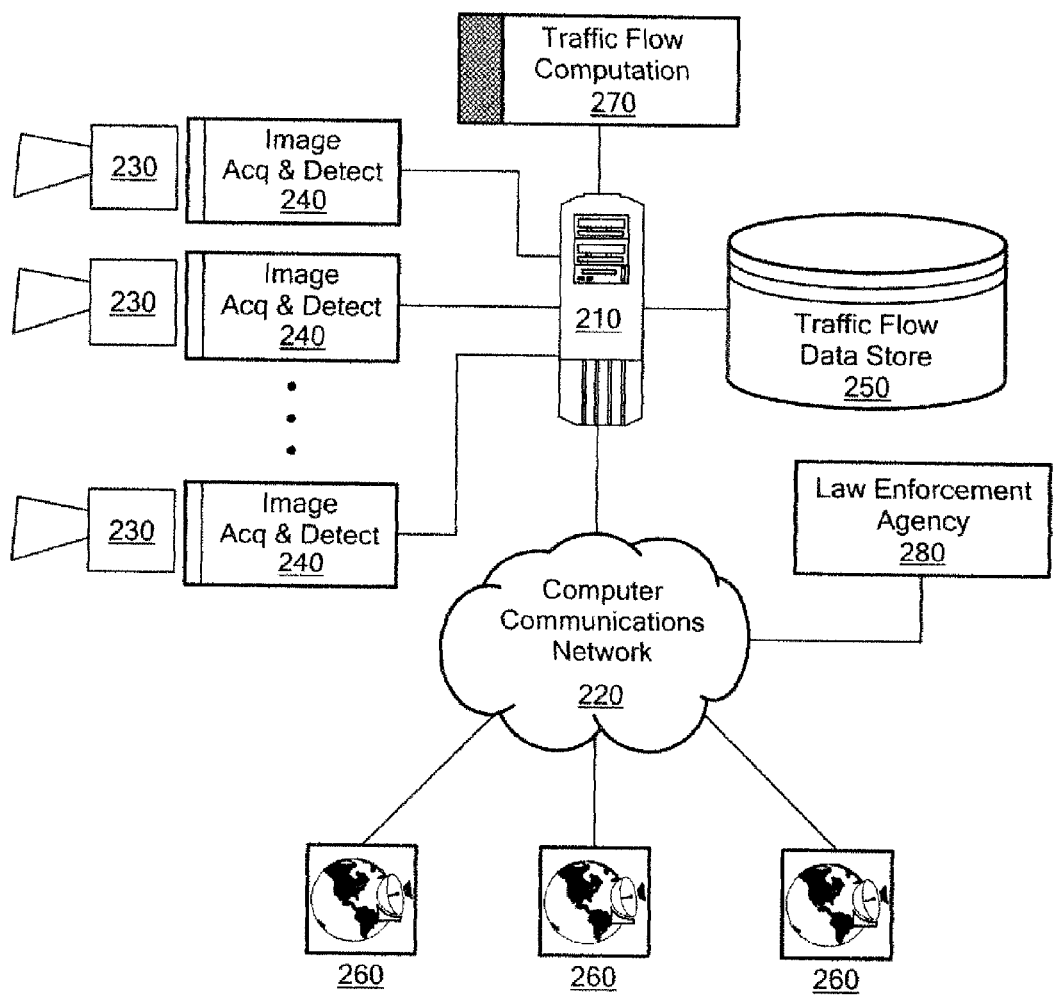
FIG. 2 is a schematic illustration of an onboard vehicle navigation data distribution data processing system configured for vehicle traffic flow data acquisition and reporting.

In further illustration, FIG. 2 schematically depicts an onboard vehicle navigation data and vehicle infraction distribution data processing system configured for vehicle traffic flow data acquisition and reporting. The system can include a host server 210 communicatively coupled to multiple different image acquisition systems 230, each including an image acquisition and detection system 240. The host server 210 can host the execution of traffic flow and speeding computation logic 270. The traffic flow computation logic 270 can include program code enabled to compute a rate of travel for different vehicles at a location based upon duration of travel between pairs of the image acquisition systems 230 and determine whether to issue a citation signal based upon a determination that speeding or other traffic violation has occurred. The program code further can be enabled to store the rate of travel in connection with each vehicle and a corresponding location within coupled traffic flow data store 250. The server 210 and the data store 250 may be accessed by a law enforcement agency 280 via the communications network 220 and the citation signal may be generated and sent to a law enforcement agency 280 by the host server 210. The citation may also be sent to a driver of a vehicle involved in the offense, and/or an insurer of a driver of a vehicle involved in the offense.

Thus, the vehicle infraction distribution data processing system may analyze images captured by one or more image acquisition systems 230 to determine a violation of a traffic law or rule. Detected violations or offenses may include speeding, improper lane change, reckless or careless driving, improper backing, failure to stop, failure to stop and render aid, following too closely and collisions, to name but a few. The data processing system may be programmed to evaluate information from imagery captured by at least one camera, optionally with input from a radar gun. Fault may be assessed based on interference with a right of way, based on a trajectory of a vehicle involved in a collision, based on a vehicle following another vehicle too closely, or based on a vehicle failing to signal a lane change, for example.

Citation information may include a name of the offense, a type of the offense, a level of seriousness of the offense, the name of the owner of a vehicle involved in the offense, the name of other owners of other vehicles involved in the offense, a name of an insurer of a vehicle involved in the offense, a time, date and location of the offense, officer citing the offense, an amount of a fine, a court date, an address where to mail a payment of the fine, etc. The content of the citation information may depend upon a type or seriousness of the offense. For example, more serious offenses may include identity of an insurer of an owner of a vehicle and the identity of owners of other vehicles involved in the offense, whereas this information may be omitted for less serious offenses.

A destination and/or manner of delivery of citation information may also depend upon a type or seriousness of the offense. For example, for less serious offenses, the manner and destination of delivery of the citation information may be wirelessly to a mobile phone of an owner of the vehicle, by email to an email address of the owner, by texting the owner, or wirelessly to an onboard navigation system of the vehicle. For more serious offenses, the manner and destination of delivery may be by regular U.S. mail, certified mail, or registered mail, or a private delivery service such as FedEx or United Parcel Service, to a residence or business address of an owner of a vehicle involved in the offense. Thus, the manner and destination of delivery of the citation may depend upon a category of the offense, such as moving violation or non-moving violation.

For example, when a vehicle's speed exceeds the speed limit but is less than a threshold, the citation information may be sent wirelessly, but when the speed of the vehicle exceeds a threshold that is greater than the speed limit, the citation information may be sent by mail. Also, the citation information may be sent by mail, email, or by facsimile to an insurer of a vehicle involved in the offense. Also, an owner to which citation information is sent may be based on an assessment that the vehicle of the owner is at fault. The selected destination for sending the citation information may be based on whether an owner of a vehicle is a business entity or an individual.

Multiple different Internet connected onboard navigation systems 260 can be communicatively coupled to the host server 210 over computer communications network 220. Consequently, rates of travel for relevant locations along a planned route in the different ones of the onboard navigation systems 260 can be provided to end users through respective ones of the onboard navigation systems 260. Further, imagery of locations along a planned route in the different ones of the onboard navigation systems 260 can be provided to end users through respective ones of the onboard navigation systems 260. The imagery can be provided at the request of an end user through the selection of an icon in a user interface in a corresponding one of the onboard navigation systems 260 at the location along the planned route. Yet further, current weather conditions acquired for the relevant locations along a planned route can be provided to the different ones of the onboard navigations systems 260.

One embodiment is a system for determining a speeding violation by a vehicle. In this embodiment, the onboard navigation system 260 can be a system in the police officer's vehicle that receives the citation signal from the host server 210. A first image capture device 230 has a first processor 240 to perform an image recognition algorithm to detect a vehicle in a first image captured by the first image capture device 230. A second capture device 230 has a second processor 240 to perform an image recognition algorithm to detect the vehicle in a second image captured by the second image capture device 230. The time of image capture can be communicated to a central processor 210 that computes a speed of a vehicle using traffic flow computation software 270, based on the times of first and second image capture and a known distance between the first and second image capture devices. The traffic flow data store 250 can be used to store speed limit data such that a comparison can be made by the server 210 between calculated vehicle speed and the speed limit between the image acquisition systems 230 acquiring the imagery. The traffic flow data store 250 can also store citation fine data and be used by server 210 to provide this information to a law enforcement agency 280 or to the police officer via the onboard navigation system 260 in the vehicle 150.

Thus, in one embodiment, image recognition is performed by a processor at an image capture device. Alternatively, the images captured by image capture devices may be transmitted to a central processor that performs image recognition on the various images captured by the image capture devices. Image recognition may be achieved by applying an image recognition algorithm to a first image to produce a first result, applying the image recognition algorithm to a second image to produce a second result, and by comparing the first and second results to determine if the same vehicle is in both images. The central processor may also compute a speed of a vehicle and generate a citation signal when the speed of the vehicle exceeds a speed limit. The citation signal may be a data signal that includes the speed of the vehicle and/or the difference between the vehicle speed and the posted speed limit. The image recognition algorithm may further detect a license tag or VIN of a vehicle and a make and model of a vehicle.

When the speed limit is exceeded, the speed of the vehicle can be transmitted to a law enforcement agency or officer. An image of the vehicle may also be transmitted to the law enforcement agency or officer. In one embodiment, a police officer may be able to remotely control a camera 230 that captures the image of the vehicles passing by. In some embodiments, the speed of the vehicle may be determined by the camera 230 or by a separate processor, e.g., server 210. The speed of the vehicle and the amount of the traffic fine for speeding may also be transmitted to an on-board navigation system of the speeding vehicle, or otherwise transmitted to the operator of the vehicle. In one embodiment, the processor 210 may automatically issue a paper citation to an owner of the vehicle. The owner of the vehicle may be identified by identifying a license tag number on the vehicle and correlating the tag number with the owner as recorded in a motor vehicle department database.

Figure 3A:
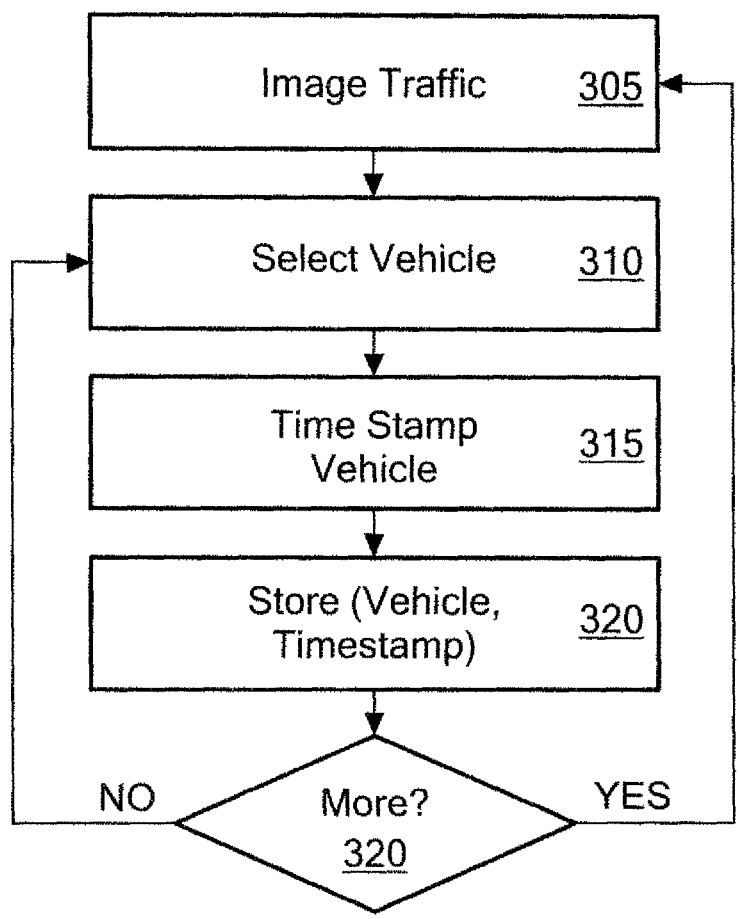
FIGS. 3A and 3B, taken together, are a flow chart illustrating a process for vehicle traffic flow data acquisition and reporting for onboard vehicle navigation.
Figure 3B:
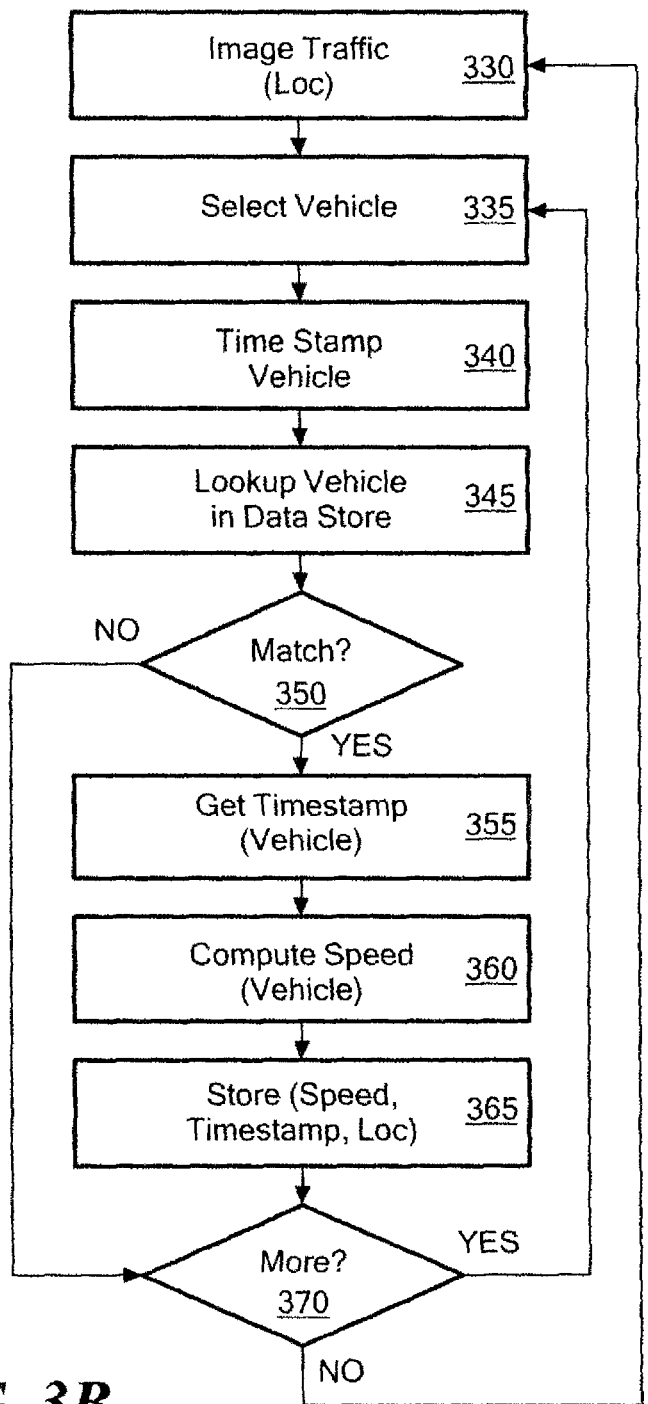

In yet further illustration of the operation of the traffic flow computation logic 270, FIGS. 3A and 3B, taken together, are a flow chart illustrating a process for vehicle traffic flow data acquisition and reporting for onboard vehicle navigation. Beginning in block 305 of FIG. 3A, traffic can be imaged at a first point in a route along a roadway. In block 310, a first vehicle in the image can be selected and time stamped in block 315 to record a time of acquiring the image. In block 320, the time stamp can be stored in connection with the selected vehicle and, in decision block 325, if additional vehicles remain to be time stamped in the image, the process can repeat in block 310. Otherwise, a new image can be acquired in block 305 and the process can continue as before through block 310.

Turning now to FIG. 3B, in block 330 traffic can be imaged at a subsequent point in the route along the roadway. In block 335, a first vehicle in the image can be selected and time stamped in block 340 to record a time of acquiring the image. In block 345, the vehicle can be compared to a data store of vehicles to determine whether a time stamp had been previously recorded for the vehicle at the first point in the route. In decision block 350, if a match is found, in block 355 the previously stored time stamp for the vehicle can be retrieved and in block 360 a rate of travel can be computed for the vehicle based upon the known distance between the points in the route and the duration of time taken by the vehicle to travel between the points according to the stored time stamp and the time stamp applied in block 340.

Thereafter, in block 365 the rate of travel can be recorded in connection with the subsequent point in the route and the time of acquiring the image at the subsequent point in the route. In decision block 370, if rates of travel for additional vehicles remain to be computed, the process can repeat in block 335 with the selection of a next vehicle in the image. Otherwise, a new image can be acquired at the subsequent point in the route in block 330.

Of note, by acquiring a multitude of rates of travel for the subsequent point in the route, an average rate of travel can be computed for the subsequent point in the route for a given range of time or for a given moment in time. The average rate of travel can be communicated to inquiring vehicles anticipating travel through the subsequent point in the route along with relevant imagery of the subsequent point in the route. Consequently, an accurate characterization of congestion for a location in a route of travel can be communicated in real time to inquiring travelers through an Internet connected onboard navigation system.

Figure 4:
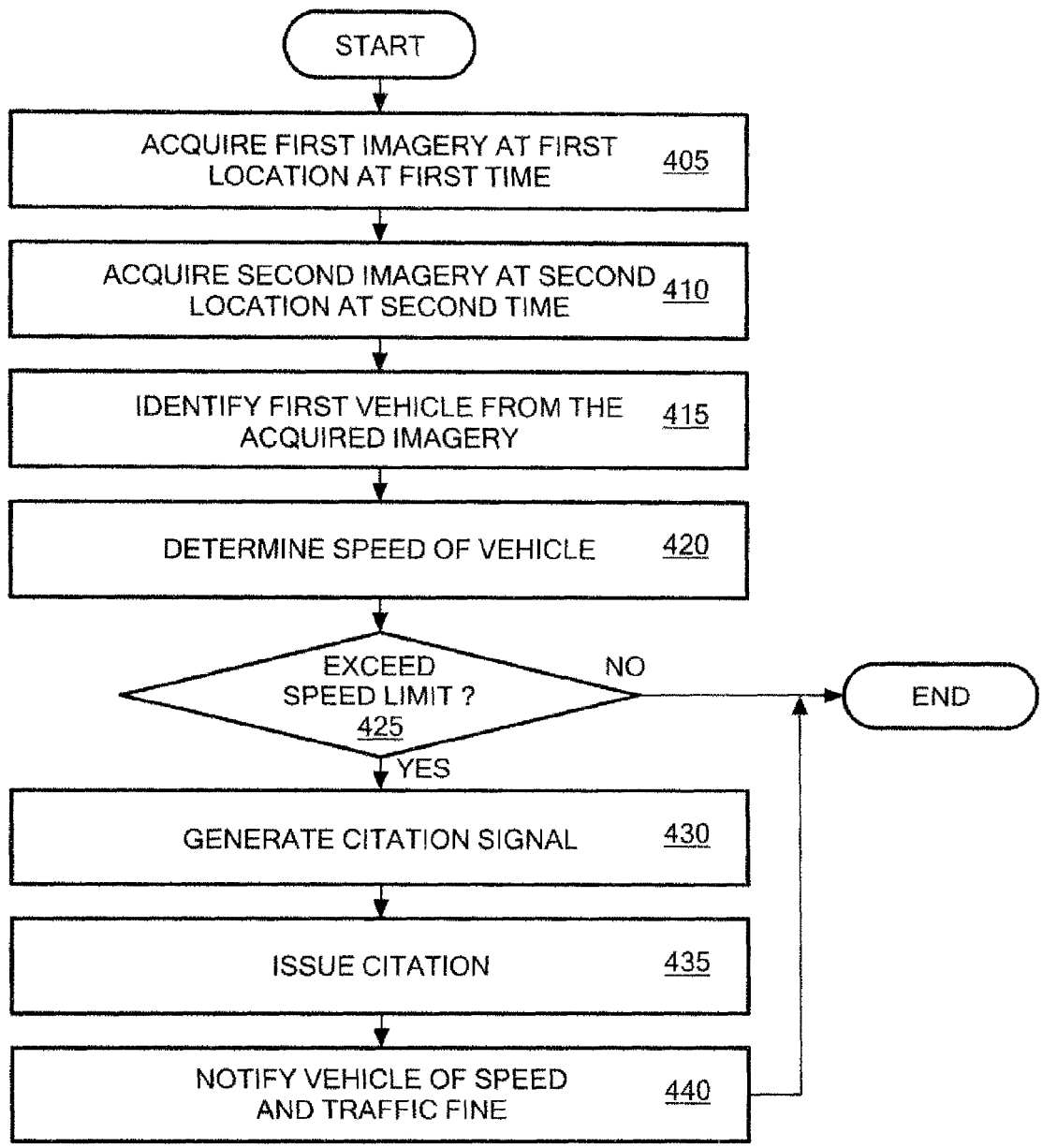
FIG. 4 is a flow chart of an exemplary process for vehicle traffic speed violation detection and citation in accordance with the principles of the present invention.

FIG. 4 is a flow chart of an exemplary process for vehicle traffic speed violation detection and citation in accordance with the principles of the present invention. In block 405, a first image is acquired at a first location at a first time. At block 410, a second image is acquired at a second location at a second time. At block 415, an identity of a vehicle appearing in both the first and second images is acquired. The speed of the vehicle is determined at block 420. The speed can be determined from the ratio of the distance between the first and second location and the difference between the first time and the second time. At block 425, the system determines if the speed limit has been exceeded by the identified vehicle. If not, the process ends. If the speed limit has been exceeded, a citation signal is generated at block 430. The citation signal may also include the speed of the vehicle, the vehicle's tag number, the vehicle's location and an image of the vehicle. A paper citation may automatically be issued at block 435 or a police officer alerted. Further, the speed and amount of the fine for speeding may be communicated to the vehicle at block 440.

Figure 5:
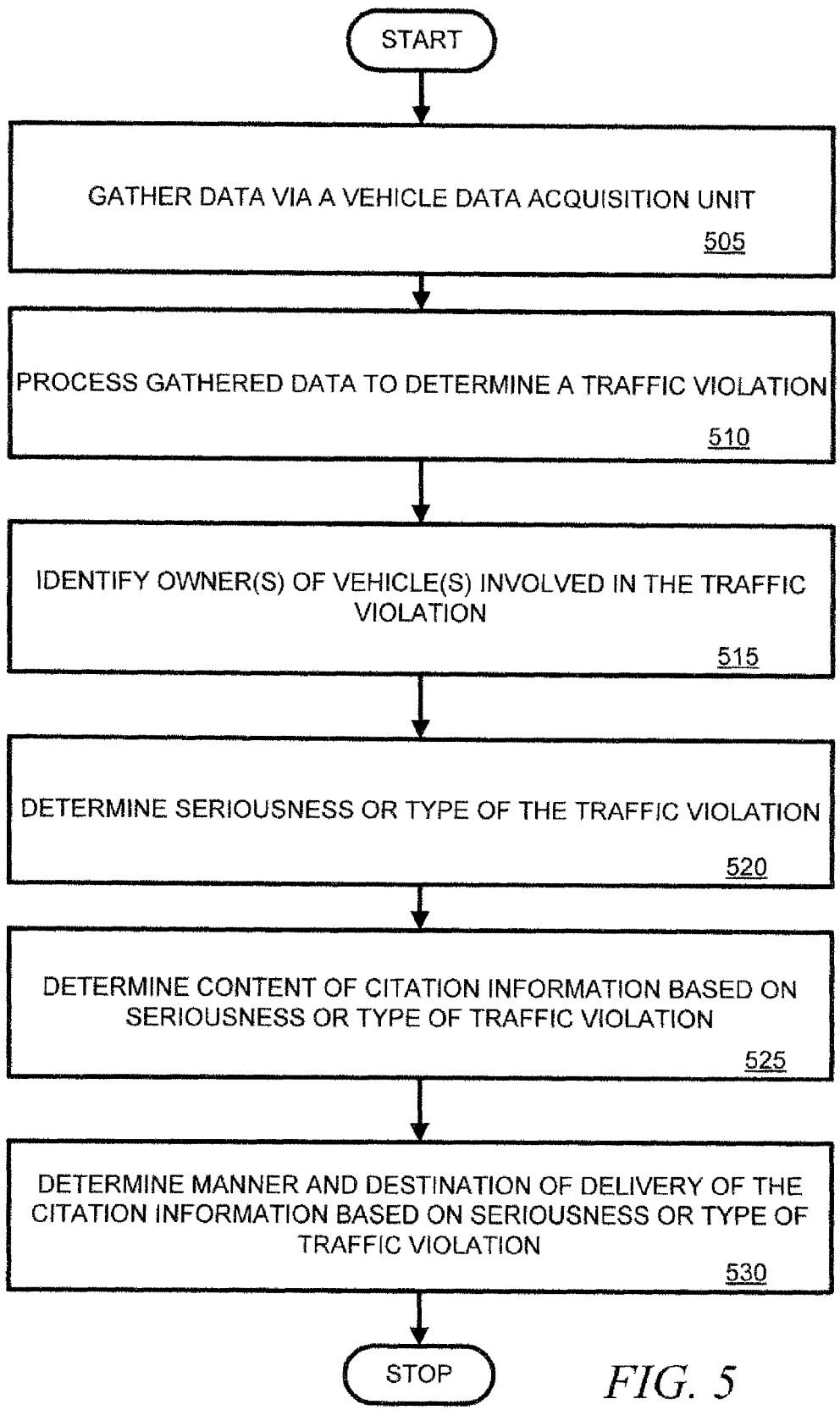
FIG. 5 is a flowchart of an exemplary process for traffic violation detection and for processing citation information.

FIG. 5 is a flowchart of an exemplary process for traffic violation detection and for processing citation information. At block 505, traffic data is gathered via at least one camera or a vehicle data acquisition unit, which may include a camera and/or a radar gun. The vehicle data acquisition unit may be placed within or be part of a law enforcement vehicle or may be separate there from. For example, the vehicle data acquisition unit may be positioned on a structure that also supports a traffic signal. At block 510, gathered traffic data is processed to determine if a traffic violation has occurred. For example, in case of a collision, it may be determined that a vehicle was speeding, or it may be determined that a vehicle was following another vehicle too closely, or it may be determined that a vehicle ran a red light, or it may be determined that a vehicle made an improper lane change.

Owner(s) of the vehicle(s) involved in the traffic violation are identified at block 515. A seriousness or type of the traffic violation is determined at block 520. Content of citation information is determined at block 525, based on the type or seriousness of the traffic violation. A manner and destination for delivery of the citation information is determined based on the seriousness or type of the offense, at block 530.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for vehicle traffic flow data acquisition and reporting for onboard vehicle navigation, the method comprising:
    acquiring, at a first location, data of multiple vehicles travelling through the first location, wherein said data is acquired from a source not travelling in the vehicle;
    individually identifying the multiple vehicles from the first location data;
    acquiring, at a second location, data of said multiple vehicles travelling through the second location; and determining an elapsed time of travel from said data for the individually identified vehicles travelling through the two locations;
    computing a rate of travel for each of the individually identified multiple vehicles based upon the elapsed time of travel; and,
    broadcasting the rate of travel for at least one of the individually identified multiple vehicles to a subscriber for at least one of the two locations,
    wherein broadcasting the rate of travel for at least one of the individually identified multiple vehicles to the subscriber for at least one of the two locations, further comprises additionally broadcasting the acquired data to the subscriber.

2. The method of claim 1, further comprising:
    calculating an average rate of travel for the individually identified multiple vehicles, wherein the average rate of travel is broadcast only when the average rate of travel falls below a threshold value.

3. The method of claim 2, wherein the average rate of travel is broadcast to the onboard vehicle navigation system of the subscriber using an internet connection with the on board vehicle navigation system.

4. The method of claim 2, wherein the average rate of travel is broadcast only when a planned route of travel in the onboard navigation system includes at least one of the first and second locations.

5. The method of claim 1, wherein the broadcasting further comprises broadcasting at least one of the first and second locations to the onboard vehicle navigation system of the subscriber.

6. The method of claim 1, wherein the broadcasting further comprises broadcasting a weather report for at least one of the first and second locations to the onboard vehicle navigation system of the subscriber.

7. The method of claim 2, wherein the average rate of travel is broadcast to the on board vehicle navigation system of the subscriber using one of text messaging and e-mail.

\* \* \* \* \*